(12) United States Patent
Evans et al.

(10) Patent No.: US 7,489,635 B2
(45) Date of Patent: Feb. 10, 2009

(54) ROUTING COST BASED NETWORK CONGESTION CONTROL FOR QUALITY OF SERVICE

(75) Inventors: Scott C. Evans, Burnt Hills, NY (US); Marc R. Pearlman, Clifton Park, NY (US); Michael J. Hartman, Clifton Park, NY (US); Asavari Rothe, Clifton Park, NY (US); Manuel A. Leiva, Gaithersburg, MD (US); Martin W. Egan, Brandy Station, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 739 days.

(21) Appl. No.: 10/950,149

(22) Filed: Sep. 24, 2004

(65) Prior Publication Data

US 2006/0067213 A1     Mar. 30, 2006

(51) Int. Cl.
*H04J 1/16* (2006.01)
(52) U.S. Cl. .............. 370/235; 370/237; 709/235; 709/242
(58) Field of Classification Search ............ 370/235, 370/238, 331–333, 400, 469, 237; 709/226, 709/235–244
See application file for complete search history.

(56) References Cited

U.S. PATENT DOCUMENTS

| | | | |
|---|---|---|---|
| 6,028,842 A | 2/2000 | Chapman et al. | |
| 6,259,673 B1 | 7/2001 | Yoshihara et al. | |
| 6,269,079 B1 * | 7/2001 | Marin et al. | 370/230 |
| 6,295,294 B1 | 9/2001 | Odlyzko | |
| 6,301,244 B1 | 10/2001 | Huang et al. | |
| 6,345,038 B1 | 2/2002 | Selinger | |
| 6,377,551 B1 | 4/2002 | Luo et al. | |
| 6,430,156 B1 | 8/2002 | Park et al. | |
| 6,594,264 B1 * | 7/2003 | Lin et al. | 370/395.42 |
| 6,904,017 B1 * | 6/2005 | Meempat et al. | 370/238 |
| 7,068,605 B2 * | 6/2006 | Cain et al. | 370/235 |

(Continued)

OTHER PUBLICATIONS

Ahn, G.-S. et al., *IEEE Transactions on Mobile Computing*, vol. 1, No. 3, (Jul.-Sep. 2002), pp. 192-207, "Supporting Service Differentiation for Real-Time and Best-Effort Traffic in Stateless Wireless Ad Hoc Networks (SWAN)".

(Continued)

*Primary Examiner*—Ricky Ngo
*Assistant Examiner*—Dady Chery
(74) *Attorney, Agent, or Firm*—Scully, Scott, Murphy & Presser, P.C.

(57) ABSTRACT

A method and system of congestion control in a network are provided. A required quality of service (QoS) parameter, such as a maximum allowable latency, for a packet received at a queue in the network, and a route cost metric, such as accumulated and estimated latency, are determined, and the packet is either discarded if the route cost metric exceeds the required QoS parameter, or a discard bias value is set for the packet. Also, if the required QoS parameter exceeds the route cost metric, the method includes determining whether a congestion condition exists in the network, and if the congestion condition exists, biasing the packet for discard based on its latency if the route cost metric for the packet exceeds a threshold. The network may be an IP network, and a network such as a mobile ad hoc network (MANET).

4 Claims, 11 Drawing Sheets

U.S. PATENT DOCUMENTS

| | | | |
|---|---|---|---|
| 7,075,927 B2* | 7/2006 | Mo et al. ................... 370/389 |
| 7,151,769 B2* | 12/2006 | Stanforth et al. ............ 370/351 |
| 2001/0033556 A1 | 10/2001 | Krishnamurthy et al. |
| 2002/0013856 A1 | 1/2002 | Garcia-Luna-Aceves et al. |
| 2002/0061001 A1 | 5/2002 | Garcia-Luna-Aceves et al. |
| 2002/0067736 A1 | 6/2002 | Garcia-Luna-Aceves et al. |
| 2002/0122432 A1 | 9/2002 | Chaskar |
| 2002/0126692 A1 | 9/2002 | Haartsen |
| 2002/0181395 A1 | 12/2002 | Foster et al. |
| 2002/0188648 A1 | 12/2002 | Aweya et al. |
| 2003/0005160 A1 | 1/2003 | Schafer |
| 2003/0033394 A1 | 2/2003 | Stine |
| 2003/0043742 A1 | 3/2003 | De Maria et al. |
| 2003/0045272 A1 | 3/2003 | Burr |
| 2003/0045296 A1 | 3/2003 | Burr |
| 2003/0058819 A1 | 3/2003 | Dawidowsky et al. |
| 2003/0058886 A1 | 3/2003 | Stanforth et al. |
| 2003/0067941 A1 | 4/2003 | Fall |
| 2003/0076837 A1 | 4/2003 | Whitehill et al. |
| 2003/0103458 A1 | 6/2003 | Shin |
| 2003/0107991 A1 | 6/2003 | Tezuka et al. |
| 2005/0041591 A1* | 2/2005 | Duggi et al. ................ 370/238 |

OTHER PUBLICATIONS

Ahn, G.-S. et al., Proc, *IEEE INFOCOM'2002*, New York, New York, Jun. 23-27, 2002, "SWAN: Service Differentiation in Stateless Wireless Ad Hoc Networks".

Arora, H. et al., *Proceedings of the Applied Telecommunication Symposium (part of the Advanced Simulation Technologies Conference)*, (Apr. 14-18, 2002), pp. 1-6, "A Simulation Study of the Feasibility of Differentiated Services Framework for QoS in Mobile Ad Hoc Networks".

Blake, S. et al., *The Internet Society, Network Working Group*, (Dec. 1998), pp. 1-35, RFC 2475, (www.ietf.org/rfc/rfc2475.txt), "An Architecture for Differentiated Services".

Braden, R. et al., *IETF* Jul. 1994, pp. 1-28, "Integrated Services in the Internet Architecture: an Overview" RFC 1633.

Braden, R. et al., *IETF* Sep. 1997, pp. 1-112, "Resource Reservation Protocol (RSVP)" RFC 2205.

Chakrabarti, S. et al., *IEEE Communications Magazine*, (Feb. 2001), pp. 142-147, "QoS Issued in Ad Hoc Wireless Networks".

Demetrios, Z. et al., pp. 1-10, "A Glance at Quality of Services in Mobile Ad-Hoc Networks" (www.cs.ucr.edu/ncsyiazti/courses/cs260/html/manetpos.html).

Floyd, S. et al., *IEEE/ACM Transactions on Networking*, (Aug. 1993), pp. 1-22, "Random Early Detection Gateways for Congestion Avoidance".

Lee, S.-B. et al., *Journal of Parallel and Distributed Computing*, vol. 60, (2000), pp. 374-406, "Insignia: An IP-Based Quality of Service Framework for Mobile ad Hoc Networks".

Nichols, K. et al., *The Internet Society*, (Dec. 1998), pp. 1-20, "Definition of the Differentiated Services Field (DS Field) in the Ipv4 and Ipv6 Headers" RFC 2474.

Sahu, S. et al., *Umass CMPSCI Technical Report 99-09*, pp. 1-26, "A Quantitative Study of Differentiated Services for the Internet".

Xiao, H. et al., *IEEE Vehicular Technology Conference*, (2000), pp. 445-449, "A Flexible Quality of Service Model for Mobile Ad-Hoc Networks".

* cited by examiner

QoS Solution Space

Route Based QoS Block Diagram

UDP Voice Performance Under Bottleneck

Qualitative Representation of Average Call Latency Under Normal and Congested Conditions

Experimental Setup

Voice Call, Performance - Percentage of Calls Meeting Latency Threshold for WBED, WRED and Tail Drop Congestion Control Strategies A Sample in time of WRED and WBED Packet Drop
Probabilities as a Function of Estimated Packet Latency Packet Cost Probability Distribution
(e.g.: End-to-End Latency)

| Policy | Average Packet Discard Rate ($p_b$) | | Packet Discard Criteria | |
|---|---|---|---|---|
| Tail Drop | 0%, 100% | if $q \leq q_{max}$ if $q > q_{max}$ | $q \geq q_{max}$ | |
| RED | 0% $max_p \cdot \dfrac{q_{avg} - min_{th}}{max_{th} - min_{th}}$ 100% | if $q_{avg} \leq min_{th}$ if $min_{th} < q_{avg} \leq max_{th}$ if $q_{avg} > max_{th}$ | CDF(U) > $p_b$ (random selection) | 9-2.3 |
| BED | 0% $max_p \cdot \dfrac{q_{avg} - min_{th}}{max_{th} - min_{th}}$ 100% | if $q_{avg} \leq min_{th}$ if $min_{th} < q_{avg} \leq max_{th}$ if $q_{avg} > max_{th}$ | CDF(metric) > $p_b$ (biased selection) | 9-3.3 |

Figure 9

Summary of Discard Behavior for Tail Drop, RED and BED

| Parameter | Definition |
|---|---|
| $p_b$ | Packet discard rate |
| $q$ | Queue length |
| $q_{avg}$ | Average queue length |
| $q_{max}$ | Maximum queue length |
| $min_{tg}$ | Minimum queue length threshold for early discard |
| $max_{th}$ | Maximum queue length threshold for early discard |
| $U$ | Outcome of a uniformly distributed random variable associated with packet |
| metric | Metric (e.g. estimated end to end latency) associated with packet |
| $CDF(x)$ | Cumulative Distribution Function. A prior probability of achieving an outcome less than or equal to x. |

Definition of Parameters

Figure 10

ROUTING COST BASED NETWORK CONGESTION CONTROL FOR QUALITY OF SERVICE

FIELD OF THE INVENTION

The present Application relates to the prevention and control of data traffic congestion and packet loss due to overload on a network, including an IP network and a wireless Mobile Ad Hoc Network (MANET).

BACKGROUND OF THE INVENTION

Data traffic on a network is subject to traffic congestion from time to time. Further, often data traffic on a network is bursty and not uniform, and therefore subject to dynamic bottlenecks. Further, traffic distribution patterns and network buffer conditions change over time, sometimes sporadically, and therefore controlling congestion may be difficult because network traffic conditions can change dramatically even between routing updates.

Internet Protocol (IP) networks, are common examples of data networks, and include LANs, intranets, and internets. In a Mobile Ad Hoc Network (MANET), which may be implemented as an IP network, there may be additional constraints beyond the constraints that exist in a wired IP network. For example, a MANET may comprise a wireless LAN or WAN. With respect to Quality of Service (QoS), additional challenges in a MANET may include limited bandwidth to accommodate data throughput, a dynamic network topology caused by node mobility and an ad hoc or decentralized layout, and possibly reduced processing and memory capacity. These factors, may result in an increased probability of networking congestion, or network congestion at a particular node of the network, and jitter. Also, MANETs often face the challenge of delivering real-time services, including voice over IP (VoIP) and delivering video and multimedia data, with various QoS requirements, in addition to transmitting more traditional data. Data congestion on the network, or at a node of the network, such as at a queue of a network router, may result, for example, in queue overloading, which can cause data packets or datagrams to be discarded from the queue. Also, packets arriving later than a certain time period (as dictated by a maximum required latency QoS parameter) due to network congestion may be useless.

Network traffic engineering techniques for congestion prevention and control include DiffServ (Differential Service) systems, in which a different priority of service is used, for different packets, based on the QoS of different classes of packet types. Implementations of DiffServ provide, for example, that voice traffic, such as VoIP, where QoS parameters often mandate stricter maximum allowable latencies, are assigned to a different packet priority class than packets for other types of data. For example, a data packet representing VoIP may have a maximum allowable latency of 200 msec compared with 800 msec maximum allowable latency for packets encoding other types of data. DiffServ does not require a separate signaling protocol. In the DiffServ system, equal treatment is given to all data packets (or data flows) of the same priority class, and packets may be assigned to different priority classes based on the QoS parameters of the packets.

Also, the RED (Random Early Detection) data traffic congestion control policy provides gateways for congestion avoidance according to which packets waiting in a queue are discarded at random when a congestion condition in the network is detected. (Sally Floyd and Van Jacobson, "Random Early Detection Gateways for Congestion Avoidance", August 1993 IEEE/ATM Transaction on Networking.)

However, there remains the problem that during extended periods of excess queue depth (queue length), large-scale failure of packets may result as the queue gets overloaded. As discussed, dynamic bottlenecking may sometime occur in a bursty data traffic environment or at unexpected times. In such cases, the failure rate of quality of service deliverability due to congestion may be sudden as the queue overloads. For example, FIG. 3 shows such a drop in the number of packets meeting QoS parameters as congestion increases (x-axis) in the DiffServ environment. Maximum allowed latency is an example of such a QoS parameter.

There is a need therefore for a method and system that overcomes these problems by decreasing the number (or percentage) of packets not meeting QoS parameters, such as latency, as congestion increases, and achieves selective drop behaviors, such as more gradual packet failure rate as the queue depth or congestion increases, or concentration of packet drops into sessions that are most expensive to complete. Also, there is a need for a method and system that achieves a reduced number or percentage of data flows that do not meet QoS parameters.

SUMMARY OF THE INVENTION

A method and system of congestion control in a network are disclosed. The network may for example be an IP (Internet Protocol) network, or a mobile ad hoc network (MANET), including a MANET implemented using IP.

A required quality of service (QoS) parameter, such as a maximum allowable latency, for a packet received at a queue in the network is determined, a route cost metric, such as an accumulated and estimated latency, is determined for the packet and the packet is discarded if the route cost metric exceeds the required quality of service parameter. Also, if the required quality of service parameter exceeds the route cost metric, the method may further include determining whether a congestion condition exists in the network, and if the congestion condition exists, biasing the packet for discard or discarding the packet, if the route cost metric for the packet exceeds a first threshold set for a distribution of route cost metrics of a plurality of packets received at the queue.

The first threshold may be set by estimating a normalized distribution of the route cost metric for a plurality of packets in a packet queue, such that the route cost metric is normalized according to a quality of service parameter for each packet of the plurality of packets in the queue, determining a discard percentile of the distribution based on a value of the congestion condition, and setting the first threshold according to the discard percentile.

Also, the route cost metric may be a latency value determined for the packet. The latency value may be calculated based on an average time in a packet queue, or based on at least one of an accumulated upstream routing latency and a downstream routing latency based on a best route of the packet.

The determining of whether the congestion condition exists may be based on at least one of a queue size snapshot relative to a maximum queue size capacity and a rate of change of a queue size.

Moreover, DiffServ implementations may include calculating the first threshold for a first packet of a first differentiated service priority class, and a second threshold, different in value from the first threshold, is calculated for a second packet of a second differentiated service priority class, and discarding the second packet if the route cost metric calculated for the second packet exceeds the second threshold.

In addition, a node transmitting packets to the queue may be notified of congestion conditions by signaling the transmitting node to reduce a packet load transmitted or allowed to an affected network node.

BRIEF DESCRIPTION OF THE DRAWINGS

FIG. 9 is a table summarizing discard behavior for the tail drop, RED, and BED policies.

FIG. 10 is a table listing definition of parameters used in FIG. 9.

DETAILED DESCRIPTION OF THE INVENTION

The following discussion describes embodiments of Applicant's invention as best understood presently by the inventors. It will be appreciated however, that numerous modifications of the invention are possible and that the invention may be embodied in other forms and practiced in other ways without departing from the spirit of the invention. Further, embodiments or features of the embodiments described may be omitted, combined selectively or as a whole with other features or embodiments, or used to replace features or embodiments, or parts thereof, without departing from the spirit of the invention. The Drawings provided herewith and the present detailed description are therefore to be considered as an illustrative explanation of aspects of the invention, and should not be construed to limit the scope of the invention. The scope of the invention is defined by the below-set forth claims.

In the following detailed description, an example of a network using an IP environment implemented as a MANET (Mobile Ad Hoc Network) will be discussed as an illustrative example. MANET's are often subject to demands that can make them susceptible to traffic bottlenecks. It will be appreciated however that the present invention may be usefully implemented in various types of networks, including networks other than MANET. In particular, IP networks other than MANETs that carry data traffic of various QoS requirements and subject to bottlenecks would be good candidates for the solutions provided herein.

Figure 1:
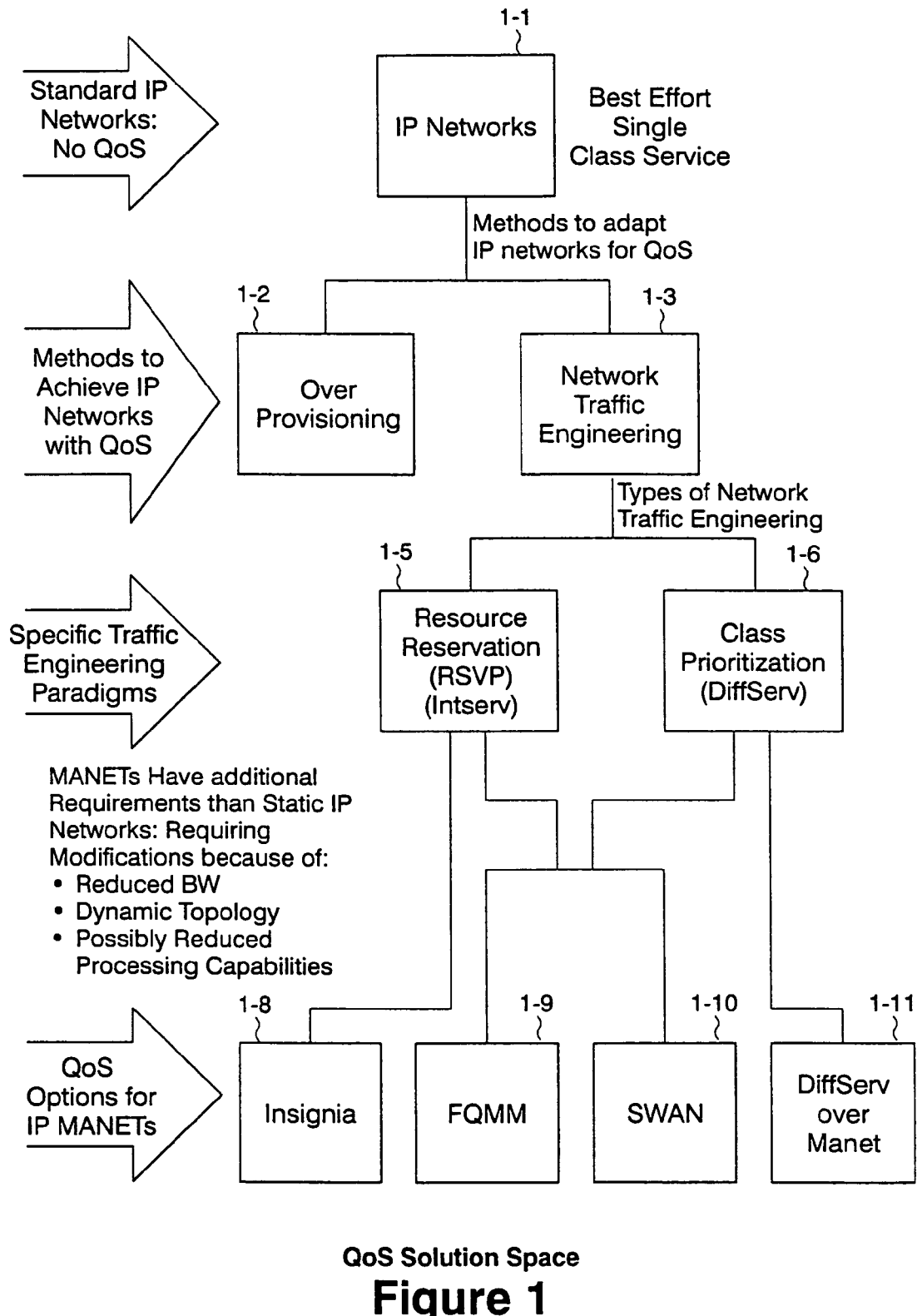
FIG. 1 shows a QoS solution space, for congestion preemption and control in a network.

FIG. 1 shows various approaches to Quality of Service (QoS) in the delivery of data, such as IP data packets, according to the prior art. A QoS requirement may be thought of, for example, as the maximum allowable latency for a data packet through a system. As throughput deteriorates (as a throughput metric decreases) due to network congestion, for example as measured by queue depth at a node of the network, packet latency increases.

The standard IP network provides "best effort" delivery. No QoS guarantees are provided for packet delivery. Methods to adapt a standard IP network to take into consideration QoS packet requirements include over-provisioning and network traffic engineering. Over-provisioning can be costly since redundant network resources have to be allocated. Over-provisioning may be particularly costly in a wireless network, such as a MANET.

Network traffic engineering solutions include resource reservation systems, such as RSVP (Intserv), 1-5 of FIG. 1. Another traffic engineering solution is class prioritization 1-6, such as DiffServ over MANET 1-11 of FIG. 1. Packet characterization may be based on flow identifiers, such as in IP v.6, or based on packet address and port number, as in IP v. 4. An indicator of a type of service (T.O.S.) may be set in a packet's header, and thus for example, the fact that a packet represents VoIP data may be determined by reference to this header information.

As discussed, a MANET often has requirements additional to those of a wired or static IP network because of constraints imposed by limited bandwidth, dynamic network topology, and/or possible reduced processing, memory, and other network resource capabilities.

Route Costs Thresholding

According to an embodiment of the present invention, QoS route costs thresholding is used to preempt congestion and overloading of a network, for example, the congestion or overload of a queue of a node, such as a router, of a MANET network. Accordingly, a packet's QoS requirements are known or detected, and compared with a relevant QoS route costs metric such as latency, including previous accumulated (upstream) latency and estimated future (downstream) latency through the network. For example, suppose a best route for the data packet has a mean routing latency of 800 msec and the maximum acceptable latency for a packet of this type (for example if the packet encodes VoIP traffic), is 200 msec. The packet will be discarded rather then admitted onto the network or placed on the network queue, since the packets has little or no chance of being delivered within the required QoS parameter.

Such route costs thresholding requires that the packet's QoS requirements, or at least the requirement of a predefined class of packets such as the QoS requirement of a DiffServ class to which the packet belongs, be known in advance or be available for being detected by the network. Unlike admission control, such route costs thresholding is not exclusively an edge function. Data packets can be reevaluated and discarded as needed while enroute to their destinations in the system. Also it should be noted that if this thresholding does occur on the edge of the network the functionality is equivalent to call admission control without additional delay and overhead in call setup and signaling.

Figure 11:
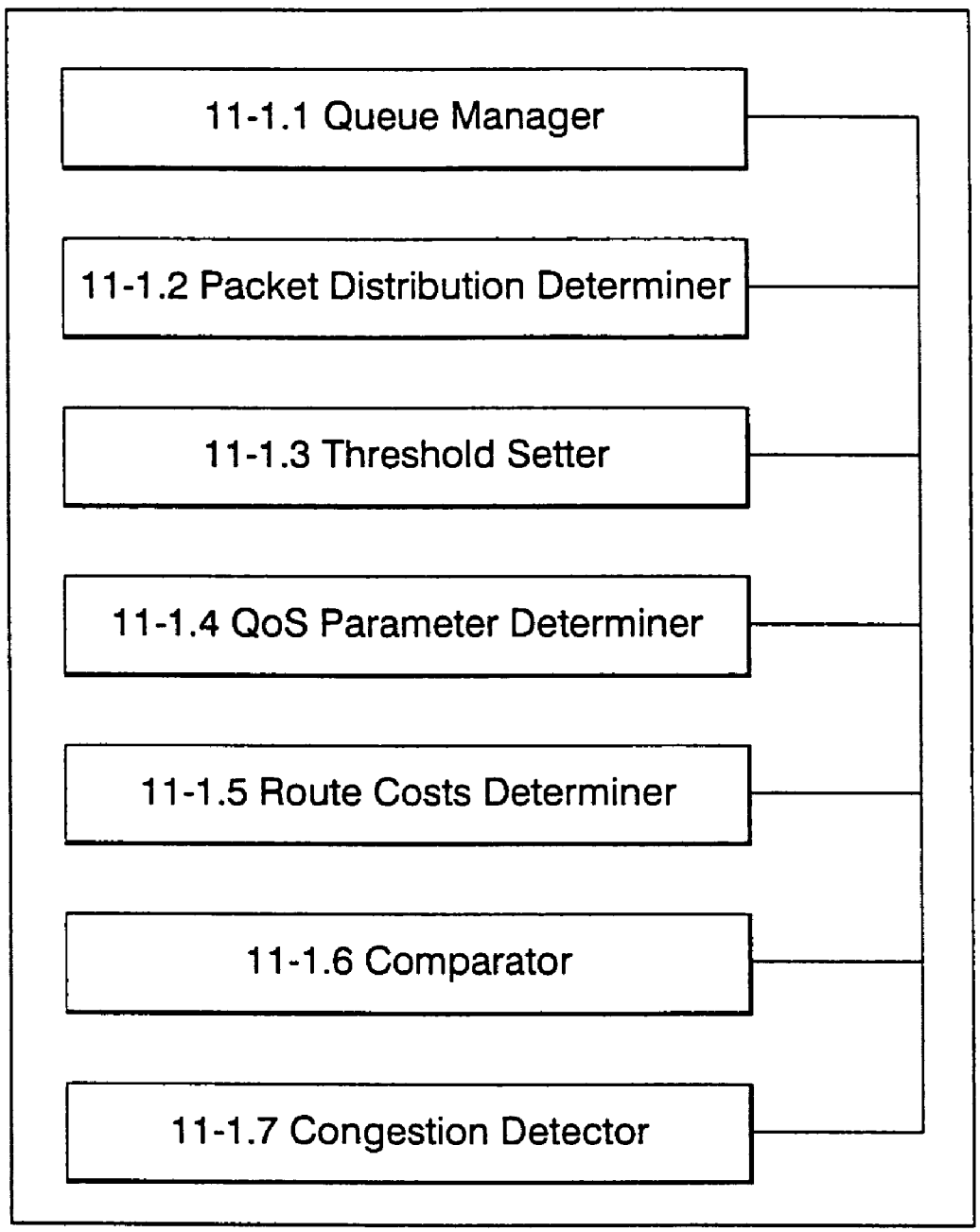
FIG. 11 shows modules of a network node according an embodiment of the present invention.

FIG. 11 shows modules of a node, such as a network router according to an embodiment of the present invention. It will be appreciated that the node may be performing some of the functions of a network node and may not be a dedicated network router. This may be the case in some MANET implementations of the present invention. Further, it will be appreciated that modules of the network node shown may be implemented in various ways, including as hardware, software, firmware, and combinations of the foregoing without departing from the spirit if the invention. The connections 11-1.01 and 11-1.02 connecting the Network Node 11-1 to the remainder of the network (not shown) may be wire or other physical connections, or may be wireless links, typical for example in a MANET.

According to an illustrative embodiment of the present invention, Queue Manager 11-1.1 of the Network Node 11-1 of FIG. 11 detects a new packet (not shown) arriving to a queue (not shown) associated with the Network Node 11-1 and signals QoS Parameter Determiner 11-1.4 to determine the QoS parameter, such as the maximum allowed latency for the arrived packet, and signals Route Costs Determiner 11-1.5 to determine estimated route costs for the arrived packet. Subsequently, Comparator 11-1.6 determines whether the estimated route costs value for the arrived packet determined by Route Costs Determiner 11-1.5 is within the QoS parameter determined by QoS Parameter Determiner 11-1.4, and signals Queue Manager 11-1.1 as to whether to discard the packet. If the packet is not within the QoS parameter, then the packet is discarded by not being added to the queue, or depending on the implementation, removed from the queue and discarded.

Figure 2:
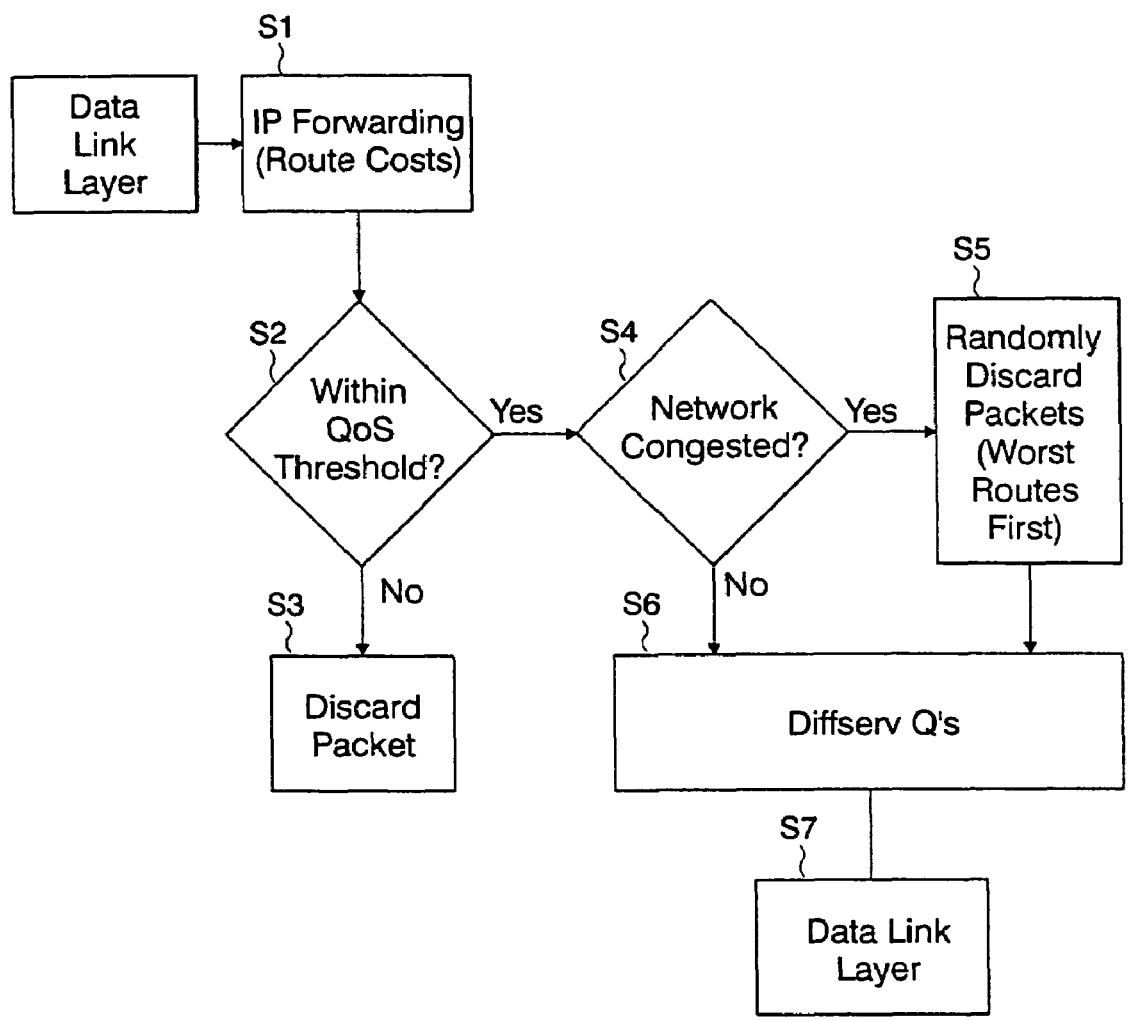
FIG. 2 shows a route costs based QoS block diagram according to an embodiment of the present invention.
Figure 3:
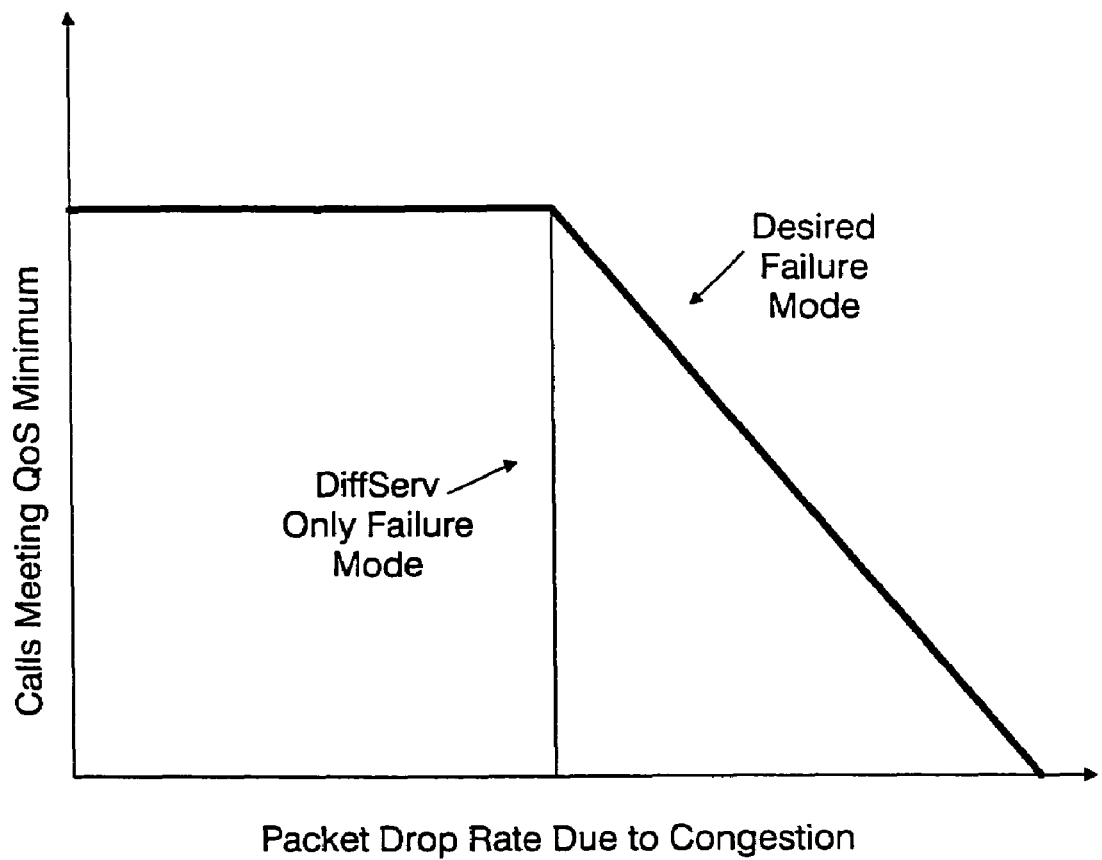
FIG. 3 shows UDP voice packet performance in a data traffic bottleneck showing values for DiffServ and for a more desirable failure mode.

FIG. 2 shows an example of such route costs thresholding according to an embodiment of the present invention. At S1, a packet is received at a network node and route costs associated with the packet downstream, such as estimated packet latency based on the best available route for the packet, are calculated. Route costs accumulated upstream, including accumulated packet latency, may also be taken into account to arrive at the total route costs for the packet.

The estimated route costs for a packet may be determined through routing table lookups or the accumulated packet metrics, as is well known in the art. For example, downstream latency can be estimated by allocating a latency estimate for each hop through the network until the packet's destination. Upstream route costs may be similarly estimated. Also, the accumulated packet cost can be updated at each hop through the network and carried in an IP header option field of the packet.

According to an embodiment of the present invention, packet latency may also be efficiently approximated based on the DiffServ average queue time for the packet, that is, the average time that packets of a certain class spend in a queue. This is because the average time in a queue usually dominates over the remaining packet latency under moderate to high network loading, when the approaches of the present invention are likely to be applied. Thus, DiffServ average queue time may be used as an alternative to the latency calculation based on the downstream packet estimated cost and the upstream accumulative cost. Average queue time may be measured at each queue, for both upstream and downstream nodes or queues. As such, to estimate a packet's latency in this way, queue time upstream and downstream might have to be calculated. However, DiffServ average queue time is a relatively easily derivable quantity. Other approximations, such as average queue depth, may be used as well if other metrics are too difficult to acquire.

At S2 of FIG. 2, it is determined whether the route costs for the packet are within the QoS threshold. As discussed, a DiffServ class may be associated with a particular QoS maximum latency requirement or the QoS threshold may be otherwise known or obtained. If at S2 it is determined that the route costs are within the QoS threshold, then the packet is allowed to proceed through the network, for example the packet is added to a queue of a network node functioning as a network router. However, if at S2 it is determined that the route costs for the packet are not with the QoS threshold associated with the packet, then the packet is discarded at S3.

Congestion Control: BED and WBED

One approach to data packet prioritization has been the DiffServ protocol, according to which packets are assigned different levels of priority based on the type of data the packet represents. For example packets encoding VoIP data may be of one class, while ordinary IP data traffic packets may be of a second class.

Under a tail drop policy, packets that arrive at a queue when the queue depth maximum has been reached (when the queue is full) are discarded. A tail drop policy can lead to sudden and severe packet discarding as a result of dynamic bottleneck conditions on the network. RED (Random Early Detection or Drop) is a discard policy designed to preempt packet failure due to exceeding maximum allowable latency parameters and to reduce data loss due to packet discard caused by a queue that is full under a tail drop policy. Pursuant to RED policy, when congestion is detected in the system, for example when a queue is too deep, packets are randomly discarded to prevent an overloading of the queue and thus to prevent data loss.

According to an embodiment of the present invention, data packets with which a higher route cost is associated are dropped first. For example as shown in FIG. 2, at S4, when a network is deemed to be congested, packets are discarded such that packets with the worst routes are discarded first (S5). The route costs associated with the packet may constitute a latency estimate for the packet based on the best routes available for the packet and may also take into account the accumulated upstream latency of the packet. In this way, packets with the most costly routes, which are therefore least likely to arrive at their destinations within QoS requirements, are discarded first. Given all other potential discards are of the same priority.

Figure 4:
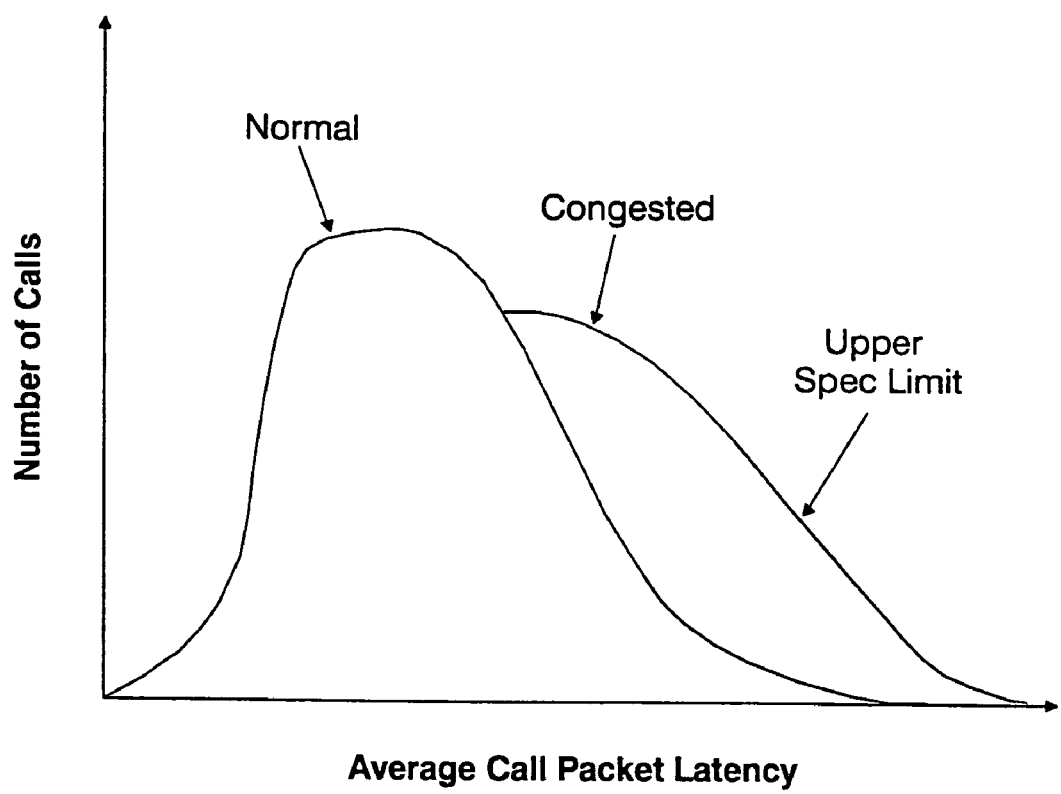
FIG. 4 shows a representation of average call or data packet latency under normal and congested traffic conditions in a network.

FIG. 4 shows a comparison of distributions of average packet latency under normal and congested conditions.

The estimated route costs for a packet may be determined in a variety of ways, including through routing table lookups or the accumulated packet metrics, as discussed in connection with route costs thresholding. To make reasonable comparisons between flows with different QoS requirements, these metrics can be normalized according to the corresponding flow QoS requirements. For example, two flows with latency requirements of a 100 ms and 500 ms, respectively, would each require a normalized metric for a normalized comparison of the route costs. The 100 ms QoS requirement might be for a VoIP packet, for example. The normalized latency metric would be produced by the estimated route costs calculated for the first flow being divided by 100 ms and that of the second flow being divided by 500 ms. According to an embodiment of the present invention, if two packets with similar estimated route costs were compared, but the first packet had a QoS required maximum allowed latency of 100 ms and the second packet had a QoS required maximum allowed latency of 500 ms, then based on the normalized metric the discard policy would be biased toward discarding the first packet (as between the first and second packets).

According to an embodiment of the present invention, latency may also be measured based on the DiffServ queue average time, that is the average time that packets of a certain class spend in a queue. The DiffServ average queue time may be used as an alternative to the latency calculation based on the downstream packet estimated cost and the upstream accumulative cost. In a manner analogous in concept to route cost thresholding discussed above, DiffServ average queue time may generally dominate over other latency metrics for congestion conditions relevant to BED and WBED policies.

According to an embodiment of the present invention, congestion is determined based on a local queue condition. Accordingly, the presence and degree of congestion are measured based on a rate of queue size change over time or rate of queue size change over received packets, or may be based on queue size "snapshots" taken at different times relative to maximum queue capacity.

According to an embodiment of the present invention, by identifying and discarding the highest latency packets or the highest latency packets normalized by the QoS maximum latency metric, data flows (groups of packets) with the highest normalized latencies will tend to be discarded first, allowing the remaining flows to be continue with acceptable performance. This bias against normalized high latency flows is done without keeping track explicitly of state information for data flows as such (but only considering individual packets). BED thus biases packet discard decisions to make it more likely to discard packets whose flows are least likely to meet QoS requirements or goals.

Packet discarding improves (reduces) local network load. Also, the resulting packet loss may be the basis of a signal for higher layer protocols, such as TCP (Transport Layer Protocol), to reduce the load allowed to proceed to, or pushed to, the affected network node.

The threshold for discarding a packet according to the present invention may be set in various ways. According to an embodiment of the present invention, an "absolute" threshold may be set based on the type of application of the packet, or based on the DiffServ class of the packet, in view of specific requirements for that type of packet. The "absolute" threshold can then be adjusted to be more or less permissive of marginal data traffic based on network needs and system resources. The "absolute" threshold can then be compared to the packet costs, such that packets with costs exceeding the threshold are then discarded. For example, voice packets with latency greater than 10 seconds are generally useless and are discarded when a congestion condition exists according to the absolute threshold. According to an embodiment of the present invention, separate absolute thresholds are set for each DiffServ class of packets, or type of packet, according to the needs for data transmission of the type of data encoded by the packet.

Figure 8:
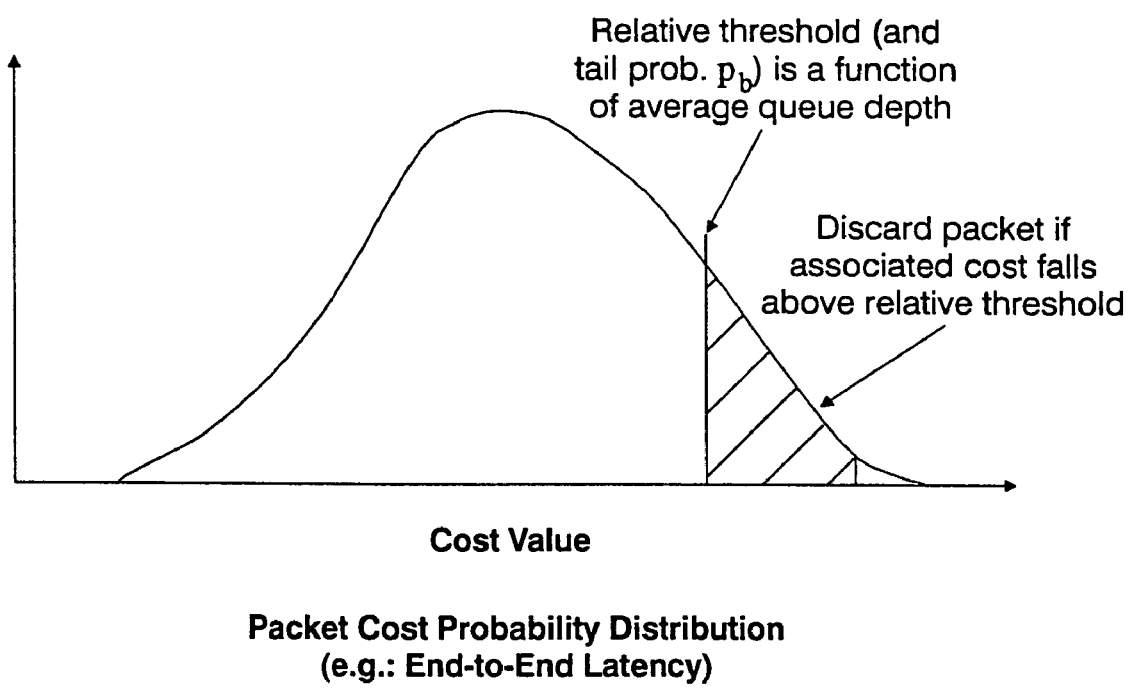
FIG. 8 shows a packet cost (e.g. latency) probability distribution (the cost value is shown in the x-axis) according to an embodiment of the present invention.

FIG. 8 shows relative thresholding according to an embodiment of the present invention in which a distribution of route costs associated with the population of all received packets is estimated, and the percentage of packets to discarded packets is determined based on the average queue depth or based on some other measure of network congestion. Packets are discarded if the route costs lie in the percentile of the distribution higher than $P_b$. Thus, in relative thresholding, the relative threshold, $P_b$, of the distribution is set such that packets with the highest route costs are discarded first. According to an embodiment of the present invention, such relative thresholding may also take into account packets of the various DiffServ classes, such that a threshold for packets of various DiffServ classes are set separately.

FIG. 9 is a table summarizing the BED (Biased Early Discard) policy 9-3.

FIG. 10 shows definitions of the parameters and other terms employed in FIG. 9. As shown in FIG. 9, according to an embodiment of the present invention, under the tail drop policy 9-1, packets are discarded when the queue is full, that is, when queue depth is greater than or equal to $q_{max}$.

According to an embodiment of the present invention, based on the average queue depth, under a BED policy, packets are discarded at the similar rate as under RED. What distinguishes the two discard policies is not how many packets are discarded but which packets are first selected for discarding. Unlike a RED policy, under which packets are discarded at random, under a BED policy, packets are selected for discard based on the associated route costs relative to the route costs of the received packet population in the queue. The packet with the higher associated route costs is more likely to be discarded than a packet with lower associated costs. According to an aspect of the invention, packets determined to fall above the threshold $P_b$ are immediately discarded.

According to an aspect of the invention, packets at the tail of the distribution above the threshold set, $P_b$, are not all discarded at once. Rather, a probability of discard is associated with each packet above the threshold, such that packets above threshold with higher routing costs, or with higher normalized routing costs, are more likely to be discarded than packets above the threshold with lower routing costs or normalized routing costs. In this way, discarding is biased or weighted toward discarding higher cost packets, such that packets with routing costs or normalized routing costs falling at the extreme right of the distribution shown in FIG. 8 will be tend to be discarded before those packets with lower routing costs or normalized routing costs falling above the threshold. Other methods of selecting a biased set of packets to discard may be used as well, and the bias can be used to increase the probability of retaining certain packets.

It is also contemplated that BED may be used in a multi-class framework, like DiffServ. Under a Weighted BED (WBED) policy, like under Weighted RED (WRED), early discard is applied within each DiffServ class. Use of network resources is thus maximized, because the relative DiffServ class priority of the packets are taken into consideration.

As shown in an illustrative embodiment of the present invention in FIG. 11, Congestion Detector 11-1.7 detects whether congestion exists on the network, for example based on queue conditions at the Network Node 11-1. The congestion condition, including a network congestion condition value, may be determined as discussed above. If a congestion condition is determined, then a distribution of the packets on the queue, or of the packets on the queue by DiffServ packet class, by packet route cost metric, such as the latency, is determined by Packet Distribution Determiner 11-1.2. As discussed, Packet Distribution Determiner may determine the packet distribution by first normalizing each packet's route cost metric by the QoS parameter, such as the maximum allowed latency, for the packet. Based on this packet distribution, or normalized packet distribution, an absolute or relative threshold, as discussed, is set by Threshold Setter 11-1.3. Queue Manager 11-1.1 discards packets that exceed this threshold, for example, by removing them from the queue. It will be understood that normalized latency may also be calculated based on historical latency data at the queue or based on latency of packets received at the queue in addition to those packets presently on the queue.

According to an embodiment of the present invention, WBED enables the lower route cost packet populations of the queue to survive a bottleneck. Since congestion tends to back up queues in all areas of the network, the benefit of using the WBED policy according to the present invention may tend to benefit not only the bottleneck node but also nodes throughout the network.

It is contemplated that the route costs thresholding described herein and the BED and WBED policies described herein may be implemented separately or together in one MANET application.

Experimental Results

Figure 5:
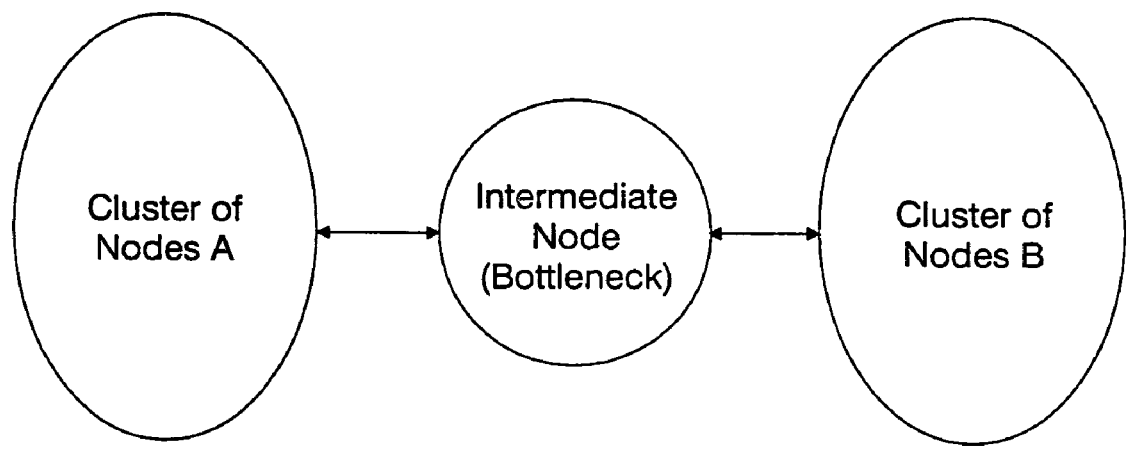
FIG. 5 shows an experimental setup of a system according to an embodiment of the present invention.
Figure 6:
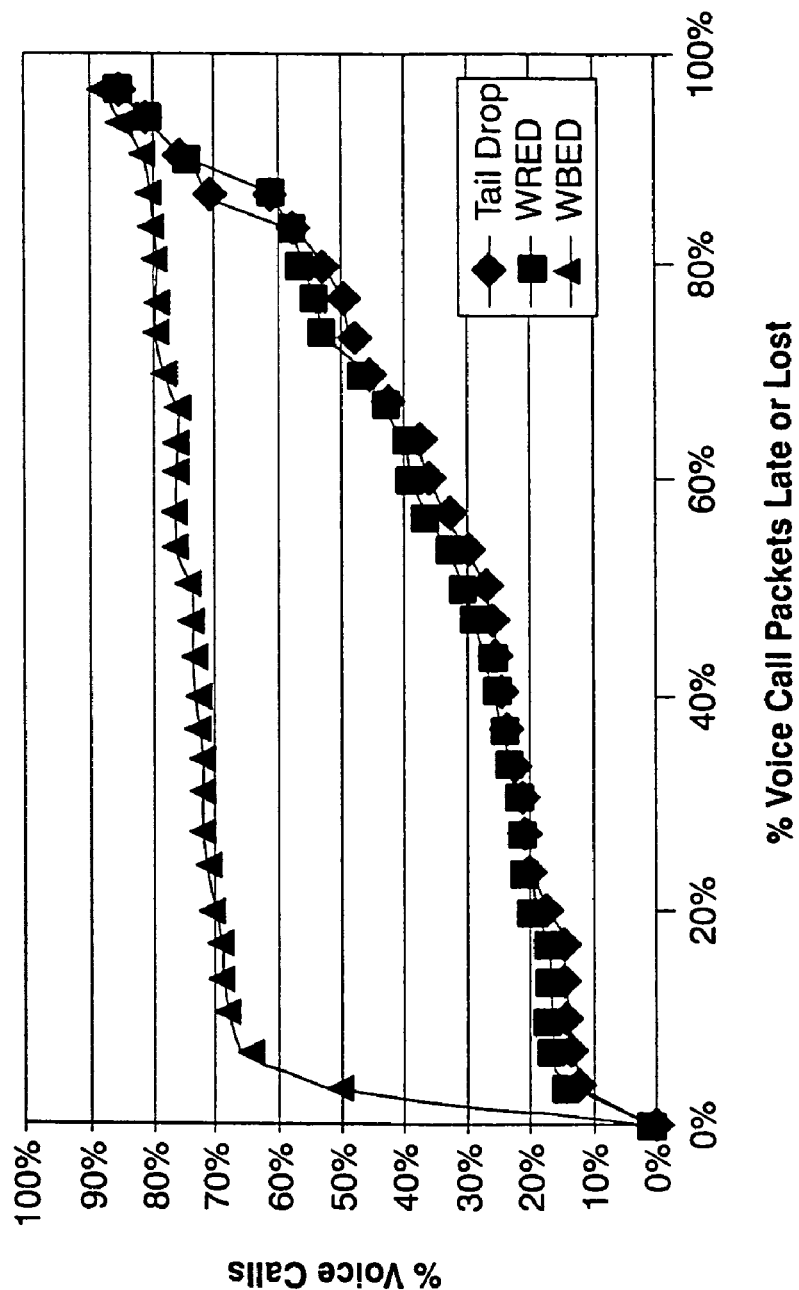
FIG. 6 shows voice call performance, the percentage of calls meeting latency thresholds comparing WBED (Weighted Biased Early Discard) WRED (Weighted Random Early Detection) and Tail Drop congestion control strategies with the percentage of voice call packets that are late or lost over the x-axis.

Results of a validation experiment of an embodiment of the present invention are illustrated in FIGS. 5 and 6. The experiment compared an embodiment of the present invention with tail drop and WRED policies based on ad hoc network simulation using OPENET™. Performance of the three policies was gauged by the percentage of calls that met specified packet delivery and latency (QoS) requirements. A network layout prone to network congestion, 216 km radius clusters, each with 21 terrestrial router nodes and an additional bottleneck router node was setup as shown in FIG. 5. The bottleneck router node provided the sole means of inter-cluster connectivity. A basic IP stack was used for network communication, with routing enabled through a proactive link state protocol. Nodes communicated with their neighbors via a 5 Mbps CSMA/CA interface with an 8 km omni directional transmission range. Each node served as an ad hoc network router and as an access point for five active voice users. Bi-directional voice calls were placed between randomly selected pairs of users. Each call generated 8 kbps of traffic (10 packets per second) and lasted an average of 5 minutes. Voice packets, which arrived at the receiving node with a latency in excess of 250 ms, were considered "out-of spec" (this constituted the Quality of Service parameter) and such "out-of-spec" packets were regarded as additional lost packets. Stateless QoS was provided through DiffServ (including the packet discard mechanism under study), and there were 5 DiffServ classes active in the simulation.

FIG. 6 shows the number of calls maintaining acceptable flow under minimum latency and within loss threshold as greatly increasing under WBED compared with either WRED or tail drop policies. For example, for a voice application that requires that at least 10% of this traffic arrive in a timely fashion (that is, arrive with latency not exceeding 250 ms, or not arrive at all), under a WBED policy, 68% of voice calls met this criterion, whereas under WRED and tail drop policies, less than 20% of the calls were deemed acceptable in this way.

Figure 7:
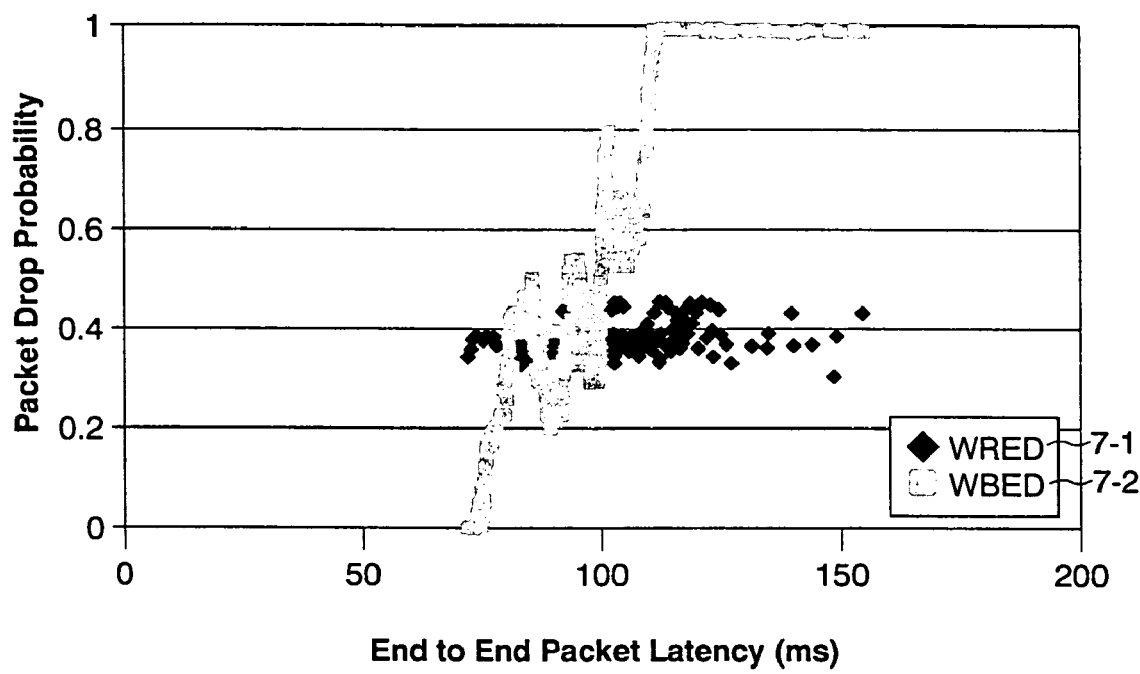
FIG. 7 shows a sample of WRED and WBED packet drop probabilities as a function of estimated packet latency (x-axis in milliseconds).

FIG. 7 shows the flow differentiation achieved according to an embodiment of the present invention based on latency discrimination. As shown by the 7-1 curve, packet drop probability is independent of end-to-end latency for WRED. However, drop probability increases almost linearly as latency increases for WBED, until the drop probability of one is achieved (7-2).

Thus, according to an embodiment of the present invention, a QoS-oriented approach is provided, including, a QoS-oriented approach using DiffServ, which may be useful in particular in UDP (User Data Gram Protocol) with some voice traffic (VoIP) or other time-sensitive or strict QoS parameter data. According to an embodiment of the present invention, without requiring substantial additional overhead, and without requiring significant additional system resources or separate signaling protocols, network congestion may be reduced and the likelihood of queue overflow and data loss may be reduced as well. Also, during peak demands on a queue capacity, the packet QoS failure rate and the packet discard rate may be more graduated, thus maximizing network throughput.

Preferred embodiments and methods of the present invention discussed in the foregoing are to be understood as descriptions for illustrative purposes only, and it will be appreciated that numerous changes, substitutions, omissions, and updates thereof are possible without departing from the spirit and scope of the claims.

What is claimed is:

1. A network congestion control method, the method comprising:
setting a discard bias value for a packet received at a network node if a route cost metric determined for the packet exceeds a first threshold, such that the discard bias value of the packet is set higher than the discard bias value for a second packet with a lower route cost metric exceeding the first threshold; and
estimating a normalized distribution of the route cost metric for a plurality of packets received at a packet queue, such that the route cost metric is normalized according to a quality of service parameter for each packet of the plurality of packets at the queue;
determining a discard percentile of the distribution based on a value of the congestion condition; and
setting as the first threshold the discard percentile.

2. A network congestion control method, the method comprising:
determining a quality of service parameter required for a packet received at a queue in a network;
determining a route cost metric for the packet;
discarding the packet if the route cost metric exceeds the required quality of service parameter,
wherein if the required quality of service parameter exceeds the route cost metric, the method further comprises: setting a discard bias value for discarding the packet if the route cost metric for the packet exceeds a first threshold, such that the discard bias value of the packet is set higher than the discard bias value for a second packet with a lower route cost metric exceeding the first threshold;
estimating a distribution of the route cost metric for a plurality of packets received at the queue, such that the route cost metrics of the distribution are first normalized based on the quality of service parameter for each packet of the plurality of packets at the queue;
determining a discard percentile of the distribution based on a value of the congestion condition; and
setting the discard percentile as the first threshold.

3. A network congestion control system, the system comprising:
a route costs determiner for determining a route cost metric for a packet received at a network node;
a threshold setter for setting a discard bias value for discarding the packet if the route cost metric for the packet exceeds a first threshold, such that the discard bias value of the packet is set higher than the discard bias value for a second packet with a lower route cost metric exceeding the first threshold;
a congestion detector for determining whether a congestion condition exists in the network,
wherein if the congestion condition exists, the threshold setter judges whether or not the packet is to be discarded based on the discard bias value, such that the packet is more likely on average to be discarded than the second packet with a lower discard bias value; and
a packet distribution estimator for estimating a normalized distribution of the route cost metric for a plurality of packets received at a queue, such that the distribution reflects the route cost metric normalized according to a quality of service parameter for each packet of the plurality of packets, wherein the threshold setter determines as the first threshold a discard percentile of the normalized distribution based on a value of the congestion condition.

4. A network congestion control system, the system comprising:

a quality of service parameter determiner for determining a quality of service parameter required for a packet received at a queue in a network; and a route costs determiner for determining a latency value for the packet;

wherein the system is configured to discard the packet if the latency value exceeds the required quality of service parameter;

a threshold setter for setting a discard bias value for the packet if the latency value for the packet exceeds a first threshold, such that the discard bias value of the packet is set higher than the discard bias value for a second packet with a lower route cost metric exceeding the first threshold; and a packet distribution estimator for estimating a normalized distribution of the latency values for a plurality of packets received at a queue, such that the distribution reflects the latency values normalized according to a quality of service parameter for each packet of the plurality of packets, wherein the threshold setter determines as the first threshold a discard percentile of the normalized distribution based on a value of the congestion condition.

* * * * *